Sept. 20, 1971     B. J. DAVIES     3,605,681

SCALE CONVERSION DEVICE

Filed May 29, 1969     4 Sheets-Sheet 2

INVENTOR
Beaumont J. Davies

BY
Holcombe, Wetherill + Brisebois
ATTORNEY

United States Patent Office 3,605,681
Patented Sept. 20, 1971

3,605,681
SCALE CONVERSION DEVICE
Beaumont John Davies, Putnoe, Bedford, England, assignor to George Richards & Company Limited, Broadheath, Altrincham, England
Filed May 29, 1969, Ser. No. 828,952
Claims priority, application Great Britain, May 29, 1968, 25,769/68
Int. Cl. B23q 17/00
U.S. Cl. 116—115.5
12 Claims

ABSTRACT OF THE DISCLOSURE

This invention is a device for fitting to machine tools enabling graduations in inches to be converted into graduations on the metric system by use of a belt which runs over the drum carrying the inch graduations as a pulley.

---

This invention relates to a device for converting measurements in a first system of units to measurements in a second system of units and is a modification or addition to the invention the subject of U.S. patent application No. 706,242, filed Feb. 16, 1968.

That application is concerned with means for continuously relating measurements in, for example, an inch scale to measurements in, for example, a metric scale and an object of the present invention is to provide means for indicating complete cycles of this system representing discrete increments of distance.

Application No. 706,242 claims a device for converting measurements in a first system of units to measurements in a second system of units comprising a cylinder carrying around it graduations representing measurements in one system of units, the cylinder acting as a pulley for driving a belt carrying graduations representing corresponding measurements in the second system of units.

According to the present invention, the device includes also a set of numerals on the cylinder or belt and viewing means on the belt or cylinder for indicating a selected one of the numerals representing the number of complete revolutions of the belt or cylinder.

In a preferred form of the invention, the belt may overlap the cylinder and have a window through which numerals on the cylinder can be viewed or may have numerals which can be shown up by specially coloured areas on the cylinder when the overlapping part of the belt runs over them.

There may be means for permitting selected relative movement between the cylinder and the belt to bring either set of numerals opposite the viewing means to zero, and this could be considered to be a part of the cylinder carrying means for allowing the belt to be movable in relation to the rest of the cylinder.

In order to facilitate setting of the zero, the belt could include a transparent strip along its length through which may be seen the mark on the cylinder opposite the zero on the numbers to be viewed through the window in the belt.

Where the belt carried numerals which could only be seen when overlapping a specially coloured portion of the cylinder, a possible mark could be put on the belt opposite the zero numerals.

Where there is only one window it may not be in view in a particular relative position of the parts and accordingly the belt or cylinder may have a number of windows or viewing means displaced circumferentially and displaying the same set of numbers. These could be axially displaced over the width of the belt.

Alternatively the belt driving part which might be the whole cylinder or a relatively movable part of it could be arranged to be loaded backwards against a spring through up to one revolution without also turning the load screw or component whose revolution was to be measured. This backward movement would enable the window to be brought into view.

If the lead screw is inaccurate a correction may be provided in association with the cursor for viewing the belt or cylinder graduations. Thus the cursor could have a number of lines each representing a different small error in one direction or the other and the movable part of the machine could indicate which line was to be used for making the reading at the corresponding position.

Again a part of the belt could have means identifying which cursor line is to be used in making the reading at that position and it may be that this could be carried by a separate part of the belt enabling the calibration to be stepped up in accordance with the measured inaccuracies.

Alternatively the lead screw or driving member could drive a cam for moving the belt or the cursor relatively to the length of the scale to be measured. The cam being shaped in accordance with the measured inaccuracies.

It may in some applications be advantageous to have means for indicating when a selected numeral is shortly to be displayed in the window showing the completion of a certain number of revolutions and for this purpose the belt may have a separate window cooperating with a part of the cylinder which is coloured or otherwise characteristically marked, the colours changing from one to another as the reading gets nearer to the desired reading. If the sleeve carrying the coloured portion is removable in relation to the cylinder this will enable the user to choose which number of revolutions is indicated in this way.

If one revolution of the belt or cylinder is not equal to $10^n$ (where $n$ is 0 or a positive or negative integer) units on the scale on the belt or cylinder, the least significant figures may be shown by windows and numbers on overlapping parts of the belt and cylinder so that a computation is not necessary.

For example, if the length of the scale on the inch system represented .25″, the decimal reading after one revolution of the scale would be .25″ and after the next revolution would .50″. The 50 would not appear on the scale but can be arranged to be shown through appropriately placed windows.

Thus the cylinder (or belt) may have lists of numbers for making up the various decimal figures required to be shown at that position while windows in the belt (or cylinder) may choose some only of the figures from the list for display in accordance with the particular relative position of the belt and cylinder.

For a standard window pattern for the fractional digits the members can be placed at the nearest sprocket hole position to the required scale mark by rearranging the list of numbers suitably. The scale marks do not necessarily correspond with sprocket positions, but the displacement of the numbers from the required position will be negligable in this case.

An extension of this arrangement is to number the revolutions in a sign and modulus method, on each side of zero and arrange the list of numbers representing the fractional part of the inch measurement and the window pattern accordingly. The sign is displayed in the same window which displays the integral number of rotations.

Additionally the device may do multiple conversions, for example a ⅓ inch pitch lead screw may drive a sprocket wheel on which a 1 inch equivalent length belt and a 10 mm. equivalent length belt are sprocketed.

Finally, it is pointed out that the invention is applicable to such instruments as micrometres which are normally arranged to give a measurement in, say millimetres or inches, but in each the conversion device according to the invention is used to enable the user to read the distance in inches or millimetres.

The device can in general be used for converting a measurement in one system of units into measurements in one or more systems of other units or the scale units or numbers. Many belts may be driven from one drum with multiple overlap and viewing from any belt any other belt or viewing through superimposed windows onto superimposed numbers.

The invention may be carried into practice in various ways and one embodiment will now be described by way of example with reference to the accompanying drawings, of which:

Figure 1:
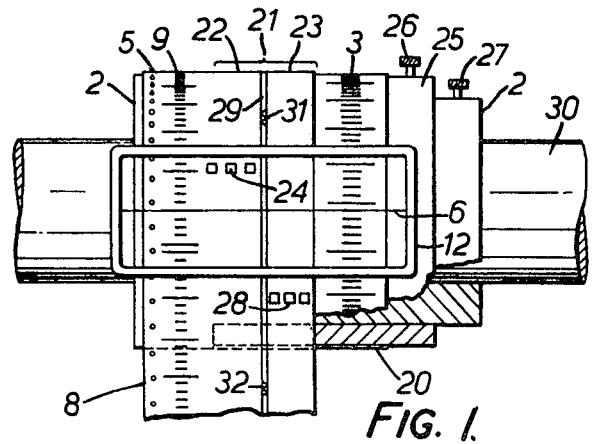
FIG. 1 shows a detail partly in section of a cylinder arranged to be driven by a lead screw in a manner described in application No. 706,242 and embodying the invention.

Indicating number of revolutions of belt or cylinder

The cylinder 2 carries the circumferential inch scale 3 as described with reference to FIG. 2 of application No. 706,242 and a belt 8 which is driven by the teeth 5 carries the metric scale 9 also as described.

However, the belt 8 overlaps a portion of the cylinder 2 as shown at 21 and this part of the belt is divided into two regions, a width 22 for giving an indication of the number of complete revolutions of the belt, and a width 23 for giving an indication of the number of complete revolutions of the cylinder. Thus width 22 includes a window shown at 24 through which can be seen numerals carried on the cylinder. Width 23 contains numbers on the belt 8 which show up against a white patch on the cylinder once per revolution. A preferred way of showing the numerals is to print them on a tight fitting belt 20 which is then pressed over the cylinder as this is cheaper than engraving the surface of the cylinder.

Datum setting

To set datum on the metric scale both the graduations 9 and the numerals on the width 22 must be set to zero. The graduations 9 are set to zero by releasing clamp screw 27 and turning the sleeve 2 (carrying graduations 9 on belt 8) on shaft 30 until the graduations read zero at the reference line 6 on the cursor 12 which is on a fixed part of the casing, and then reclamping screw 27. In general the number appearing in window 24 will then not be zero. The numerals on the belt in portion 22 are not in numerical order and so some provision must be made for locating zero quickly. This consists of a transparent zone 29 on the belt between portions 22 and 23 through which can be seen a mark 31 on the sleeve 2 in line with the zero position.

Thus the number seen through window 24 is marked on a sleeve 25 or on a belt 20 which is carried on sleeve 25, which is carried by the cylinder 2, and this is set to zero by releasing screw 26 and turning sleeve 25 until the mark 31 is lined up to the window 24. Screw 26 is then retightened.

From the datum position, after one complete revolution of the belt 8 in the positive direction, the window 24 will cover a different part of the cylinder 25 beneath the window. 001 is marked on this portion of the belt and this number appears in window 24 indicating one revolution of the belt 8 from datum. In the case described this represents a distance of 10 mm., as the equivalent of length of the belt is 10 mm. and the equivalent circumference of the cylinder is ¼ inch.

After the next revolution in the positive direction, 002 is marked on the cylinder under window 24 and so on.

For a lead screw of 0.25 in pitch and a belt length representing 10 mm. this process can be repeated for 127 revolutions of the belt when the metric zero repeats and the cycle begins again, so that all numbers from 000 to 126 in this case appear on the portion of the cylinder under portion 22 of the belt 8. The numbers are not in arithmetrical order.

In practice it is simple to calculate the sequence of numbers required for any equivalent screw pitch or belt length. For example the sequence of numbers described above is obtained by repeatedly adding 40 and subtracting 127 whenever the cumulative sum is greater than 127.

In the above case the complete cycle represents $127 \times 10$ mm.$= 1.27$ metres $= 50$ in. For lengths along the lead screw exceeding 1.27 metres, 1.27 metres must be added to the dial reading.

Figure 2:
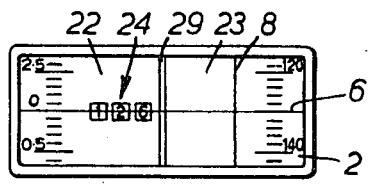
FIG. 2 shows the reading in one position in which the windows on the metric system are in view.

FIG. 2 shows the view through the cursor 12 when one hundred and twenty-six revolutions of the belt have been completed and this represents a distance along the lead screw of 1260.0 millimetres.

With a cylinder 2 of three inches diameter, or about ten inches circumference, the one hundred and twenty-seven numbers are spaced about 0.08 inch apart and each part of the window is 0.08 inch wide. As the numbers must be small to get in this space, a magnifying glass may be incorporated in each window with a magnification of perhaps two or three.

The window comes into view once per revolution so that to make the reading in any position of the belt, the cylinder should be turned backwards after the graduations on the tape have been noted until the window appears and then the number in the window is added to the tape reading.

It is convenient to use white or transparent numbers on a black background on the cylinder while the tape is black with a transparent window 24.

Possibilities for reading numbers in more than one belt position

If one wanted not to have to turn the belt back to find the number of the complete turns of the belt, one could have the width 22 of the belt increased by the width of a number of extra windows and these could be spaced along the length of the belt so that always one window would be visible. The cylinder would have corresponding sets of numbers, which would be circumferentially displaced with respect to one another by the same amount as the windows are displaced.

Alternatively, the cylinder could be marked with numbers along a one hundred and twenty-seven start thread. Thus, the number 0 could be marked repeatedly at say ¼ inch spacing in a helix; then the next number (40 in the above case) would be marked similarly along the next helix, and so on until the complete one hundred and twenty-seven start helix is formed. The viewing window can be a one-start helix of the same pitch so that it will disclose a particular one of the one hundred and twenty-seven helixes in each revolution.

Both these modifications require an increased length of the overlapping part of the belt and cylinder. An optical magnifying system may be used to enable small figures to be used to reduce the length of the overlapping part.

An alternative way of obtaining a more frequent indication of the number of belt revolutions which does not require an increase in the overlap length is to have multiple windows 24 in portion 22 of belt 8 looking at different parts of the one set of numbers round cylinder 25. In the above case if a second set of windows 24 is placed in the portion 22, 127 number spaces from the first set, the number of belt revolutions will appear twice per revolution of the belt. Alternatively, a window in the units position can be spaced in a similar manner every 32 number spaces in the positive direction. This will show the number of turns (least significant digit only) correctly up to 97 turns (beyond 97 turns the number will change and 7 must be added to it for the correct reading).

The number appearing in a window 54 number positions away from window 24 in the positive direction, will be one greater than the number in window 24.

A further alternative method is to arrange that the sleeve 25 can be turned back until the window shows without rotating the lead screw. This may be achieved by mounting the cylinder 2 on lead screw shaft 30 in such a way that it is free to rotate backwards on shaft 30 without turning the shaft. The cylinder 2 is spring loaded against a stop which is set for setting datum.

This method causes the reading on part 9 of belt 8 to change while the window is being viewed. To eliminate this portion 9 and 21 of belt 8 can be split into two sprocketed belts so that only portion 21 is moved when the window is brought into view.

Figure 6:
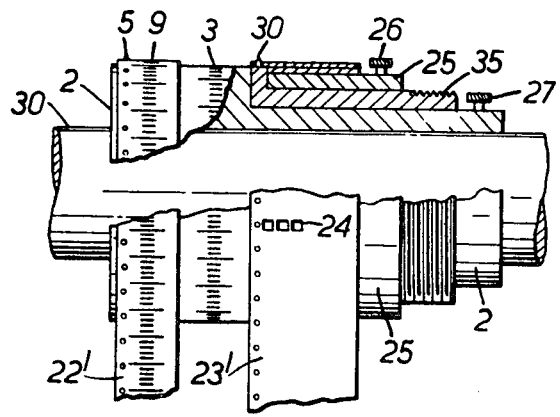
FIG. 6 is a diagram of a modification for easy reading.

FIG. 6 shows a section of a possible arrangement in which the parts are numbered the same as in FIG. 1. Part 29 carrying the portion 21 of the belt is free to rotate up to one revolution backwards on cylinder 2 and is spring loaded forward against a stop.

Counting turns of cylinder

The arrangement for counting complete revolutions of the cylinder 2 on the inch scale is similar. In this case, the window is as shown at 28 in the width 23 of the belt and consists of white patches in the black surface of the inch cylinder in line with the zero. The revolution numbers are marked on the belt width 23 in black so that the numbers only show up when they come over the white patches. In the example given, the complete cycle, before the zeros of the cylinder and the belt line up again, is two hundred revolutions of the cylinder 2 and there will be two hundred numerals on the belt. Alternatively transparent numbers on a black background can be used on portion 23 of belt 8 so that white figures show up against the white patch on the cylinder.

It is clear that if the length of the cylinder or the tape does not correspond with .1, 1, 10, 100 or in general $10^x$ units special arrangements will have to be made for giving a direct reading when a complete turn is completed because the displayed numbers showing the number of complete turns not merely increase by 1.

Figure 3:
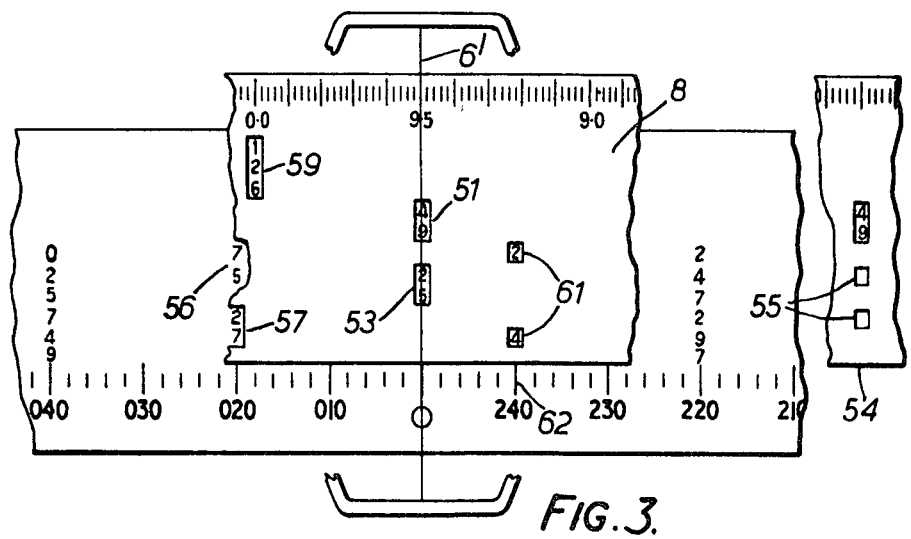
FIG. 3 shows the reading in a position when a reading showing 49.25 on the inch scale is in view.

Thus in FIG. 3 a system is shown in which although the length of the belt represents 10 millimetres the length of the cylinder represents 0.25". In the position shown in the figure the length of lead-screw traversed is 49.25", when the cylinder has made a further revolution the length displayed should be 49.50.

This is achieved in the manner shown in the drawing. Thus the figure 49 marked in black on the belt 8 is shown up when it reaches the cursor line 12 by the appropriately coloured patch or window 51 marked on the cylinder, and for four revolutions the number shown over the window 51 will be 49 before it changes to 50 for four further revolutions. The fractional parts of an inch corresponding to the individual revolutions are shown by numerals 5 3 marked on the cylinder in line with the 0 or 250 scale marking, and revealed through windows 54 cut into the belt 8.

The numerals are arranged in a line of six on the cylinder and in fact in the example being described the six numerals in line with the 250 mark on the cylinder representing one complete turn are 0 2 5 7 5 0, and it can be seen that the windows 53 disclose the second two of these numerals, namely 2 5. When the cylinder completes a further revolution it is arranged that the white patch 51 again shows up a number 49 as marked on the belt 8 but at this position of the belt there will be windows in the third and sixth positions in the line of six showing the numbers 5 0. Completion of the next revolution will cause windows in the fourth and fifth positions to show the numbers 7 5 from the series of six, and a further revolution will bring windows in the first and sixth positions in line with the column of numbers marked on the cylinder to reveal the numerals 0 0. In this position the first of the four numbers 5 0 will be shown up over the patch 51.

A displaced part of the belt 8 is shown at 54 with the windows 55 indicated in the third and sixth positions for showing up the numerals 5 0 when they reach the surface of the cylinder after the next revolution.

In order that the fractional part of an inch can be shown up otherwise than at complete revolutions of the cylinder, sets of six figures are marked on the cylinder in line (or approximately in line) with markings on the cylinder other than the 250 marking. In fact as shown a set of figures is marked at every .020" as indicated on the cylinder.

It is clear that if the belt and cylinder are moved to the left in the figure to bring the 240 mark in line with the cursor 12 the windows in the tape show the numerals 2 4 so that the distance along the lead screw is 49.24". Further to the right in line with the mark 220 can be seen the set of six figures 2 4 7 2 9 7 and appropriate windows in the tape can be arranged to indicate any of the four figures 2 2, 4 7, 7 2, or 9 7, depending on which revolution of the cylinder has been completed. Similarly it can be seen at 56 that whereas the window 57 shows the decimal numerals 2 7 in line with the 020 marking on the cylinder, two other numerals 7 5 in the series of six are available for display when the windows in the tape are positioned over them.

There will be two windows for selecting the appropriate two of the series of six figures in all positions of the tape as shown generally at 61, but only those which happen to be over one of the six figures in a particular relative position of cylinder and belt will reveal any figures so that the display will be reasonably clear as can be seen from the drawing.

Ideally the list of six figures should be marked on the cylinder exactly opposite to the relevant markings on the scale. In the simple example described they must be placed at intervals of four sprocket holes, because the window pattern 61 is repeated every four sprocket holes (FIG. 5) because in turn the fractional part of adjacent numbers in window 51 changes in sequence of position by .25", e.g. 15.7̲5̲, 31.5̲0̲, 47.2̲5̲, 13.0̲0̲, 28.7̲5̲ (See 63 in FIG. 5 where the numbers that will appear in the windows 61 are indicated.) Thus the numbers will not exactly line up with the divisions 62 on the tape. However the numbers can be moved to the nearest sprocket hole merely by altering the order to correspond with the window pattern in the required sprocket hole position. For example if the set of six figures was 247297 with the figures 2 and 7 displayed in windows in the fourth and sixth positions, and if it was required to move the numbers to the sprocket position nearest the scale graduation where the windows were in the second and fifth position, the sequence of numbers would be X2XX79. The numbers in the positions marked X can be determined by a similar procedure during three sequential revolutions of the tape.

If the sign and moduless value are required about zero, the window pattern 61 and the sequence of numbers 53 remains the same for the positions corresponding to 100 revolutions of the .25 inch pitch screw (to which the device is attached), in the position direction from zero. The window pattern and numbers are then duplicated in the negative direction about zero. For example after 1 turn in the negative direction the number and window pattern are arranged to read 00.25; after 2 turns 00.50, etc., up to 100 turns in the negative direction representing −25 inches.

A sign can be added to the digits 53 such that a + always appears in the positive direction and a − in the negative direction.

Alternatively the most significant digit position of the window 59 can be used for display if the metric scale is also arranged to operate in the "sign and moduless" mode since in that case the maximum displacement would be ±63.5 cm. (i.e. 127÷2), needing only two digits instead of three before the decimal point.

A similar window arrangement to 62 and a similar number arrangement to the sets of six numbers is required. In fact only 2 windows and 2 numbers per division are needed on the mm. scale as only one digit has to be changed.

A similar arrangement could be adopted for the metric scale but in the example shown this is not necessary because the length of the belt corresponds to 10 millimetres so that the numbers shown in the window 29 will increase by 1 with every revolution of the belt and the next decimal figure can be read directly from the scale on the belt.

Similar considerations for all features described for the metric part of the device apply to the inch part of the device.

Figure 4:
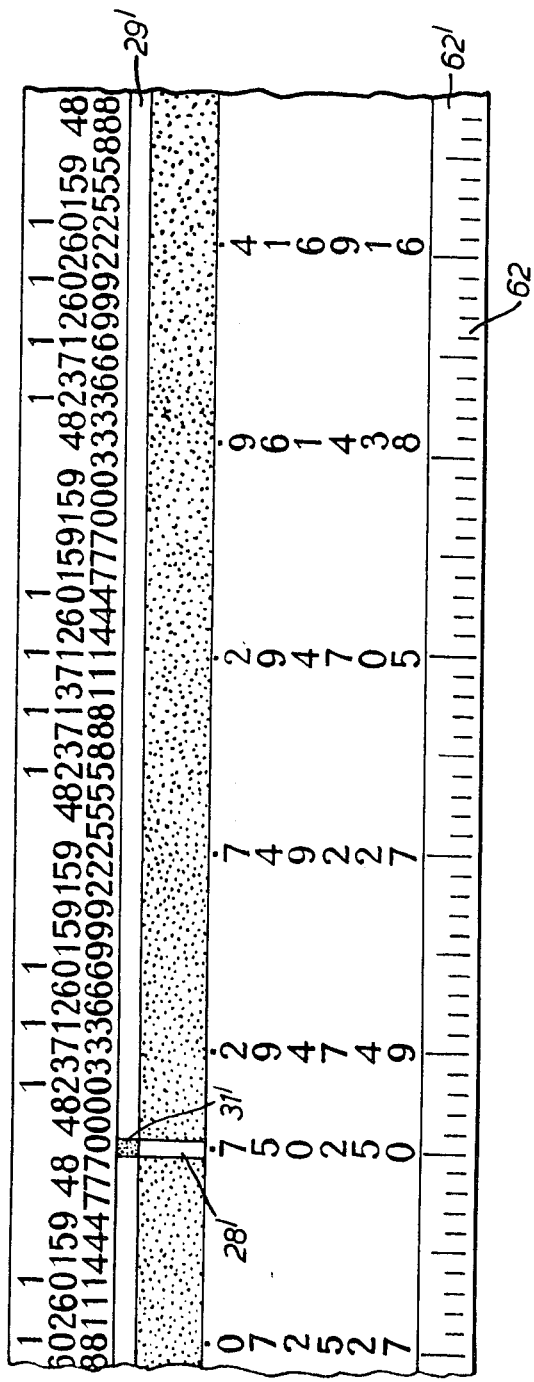
FIGS. 4 and 5 show belts for use in the system described with reference to FIG. 3.
Figure 5:
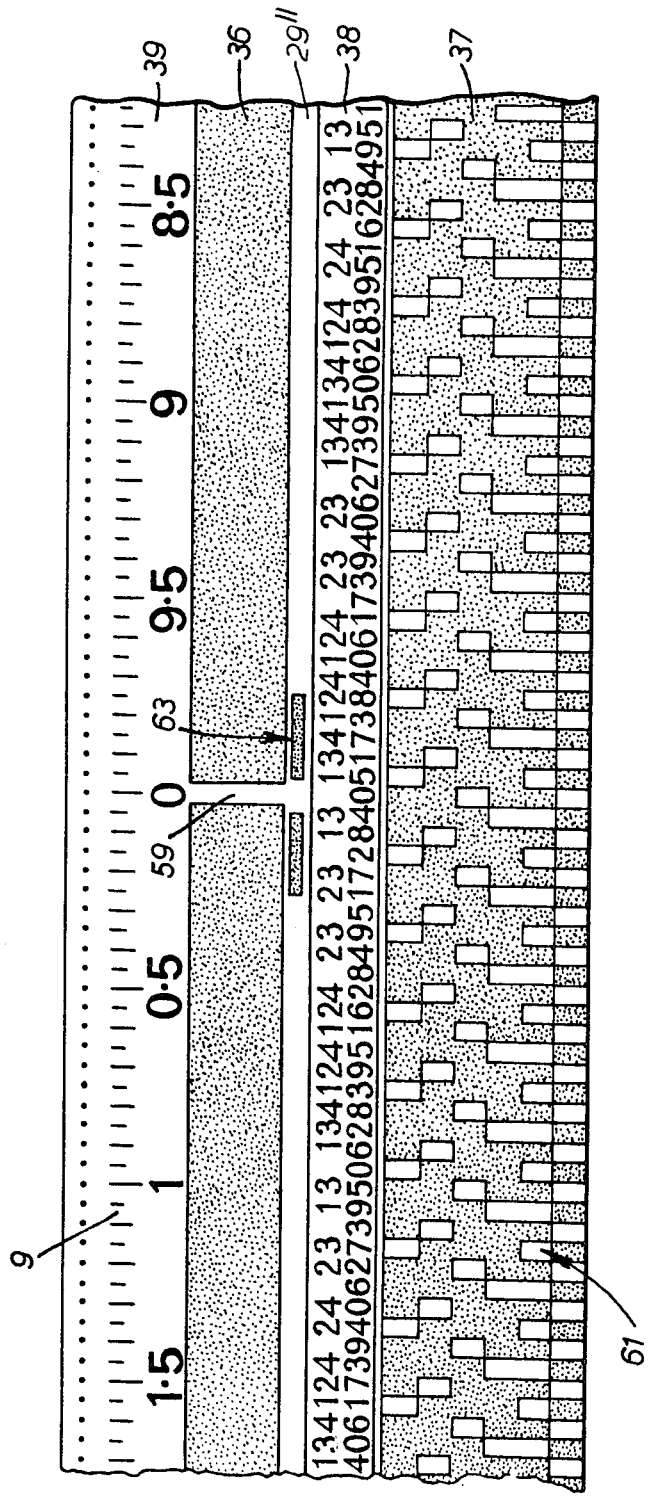

FIGS. 4 and 5 show examples of actual belts 8 and 20 for one embodiment.

Datum setting on inch cylinder

The datum can be set by unclamping screw 27 FIG. 1 and turning cylinder 2 until a mark 32 on the belt opposite the numerals 000 is against the cursor line and then reclamping screw 27. Then the screw 26 is unclamped and the sleeve 25 is turned until the zero on the scale 3 lines up with the cursor, when the window 28 will be in line with 000.

Correction of leadscrew errors

Provision can also be made for correcting errors in the leadscrew. The cursor 12 can be engraved with say 5 lines each representing a displacement of .0005 in. on either side of the zero line. These lines are clearly marked +1 to +5 and −1 to −5, and are used for both the inch and metric scales. Using a convenient length measuring device mounted on the machine to which the inch/metric dial is attached (e.g. a line standard or equivalent and microscope) the carriage is positioned at say inch or half inch intervals and the line under which the zero on the scale occurs (either inch or metric) is noted. These numbers (i.e. +3) are then mounted on the machine in the appropriate position along the slide against a mark on the moving member. If a corrected reading of the inch or metric dial is required at any position the nearest number on the slide is noted and the line marked with this number is used to read the inch or metric dial.

Figure 7:
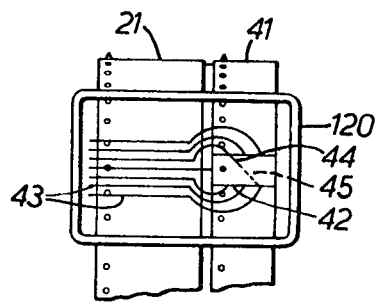
FIG. 7 shows one way of allowing for lead screw inaccuracies.

Alternatively, a separate zone may be left on in part 21 of the belt on which the error is marked once per revolution of the belt or drum. It is necessary for this to be a separate belt 41 which does not turn when datum is set if datum is to be set at any point in the traverse. One way of marking this belt is shown in FIG. 7. The markings can be in black on the belt 41 and shown up against a white patch 42 on the cylinder as in the case of the inch scale, or colours can be used.

The cursor 12 has a number of engraved lines 43 etc., one of which is to be used depending on the lead screw inaccuracy at that reading. The lines 43 lead to different points on the periphery of the area of cursor which will be over the patch 42 in the reading position, The belt is marked with a line 44 (or 45) which indicates which line 43 is to be used.

Alternatively the device can be cam corrected from a linear cam along the traverse of the slide. A cam follower can be made to rotate either the body of the device or move the cursor along the belt.

Visual indication of approaching number

The device can also be adapted to show while running the approach of a preset number of turns of the belt. An additional window is required in the millimetre belt. Let us assume that the number of turns we wish to identify is zero. When the number in the window 24 in the metric zone 22 reads zero, the position of the cylinder under the additional window is coloured green, for example. For the next 10 turns from zero in the positive direction the equivalent positions are coloured dark blue and for a further 50 turns the equivalent positions are coloured light blue. For 10 turns from zero the negative direction the equivalent positions are coloured red and for a further 50 turns the equivalent positions are coloured orange. Thus when the light blue or orange background through the window 24 turns to dark blue or red, the user knows that he is within 10 turns of 0. The apperance of the green shows that zero has been set without the numbers having to be closely studied.

To enable any number to be selected, the zone of the cylinder under the window carrying the colours is made on a separate sleeve with angular adjustment. The sleeve is numbered so that when the appropriate number, say 50, appears in another window in the belt opposite 000 on the cylinder, the green mark will appear in the window at 50 turns from datum. It is convenient to have more than one window through which the numbers can be seen in the belt to assist in locating members quickly in the window opposite 000 as the numbers are not in order. It will be found that for the ¼ inch pitch screw and the 10 mm. belt a window every 32 places from zero will indicate consecutive numbers with an increment of 5. If now windows are also put in number positions 2, 3, and 4, the required number can be found as follows. The numbers appearing in the windows will always lie within a range of 40. If the range is too low turn the sleeve one or more steps to the right; if too high turn one or more steps to the left. In this way a number within 5 of the required number will be found. Then turn the sleeve until the 000 window is opposite this number and the required number will appear in one of the windows in positions 2, 3 or 4. The sleeve is then turned until the required number appears in the 0 window.

In principle a similar arrangement can be made for inches but physically it is more difficult to achieve.

The device is described for a ¼ inch pitch lead screw and a 10 mm. belt but the same arrangement can be made for any inch pitch lead screw with its appropriate metric belt, or any metric pitch screw with an appropriate inch belt. More generally the principle can be applied to multiple scaling or multiple conversion between units.

FIGS. 6 and 7 show one example of the belts used in the embodiment of FIG. 3.

Use for micrometre

An adaption of the basic device described is suitable for a metric/inch micrometre. Preferably the micrometre screw has a millimetre pitch. The drum of the micrometre is preferably about 1 inch in diameter with 50 sprocket teeth. The belt representing .1 inch has 127 sprocket holes about .06 inch apart. Sufficient windows can be provided in the belt and on the cylinder for the number of turns to be always visible at any particular reading of the micrometre.

Figure 8:
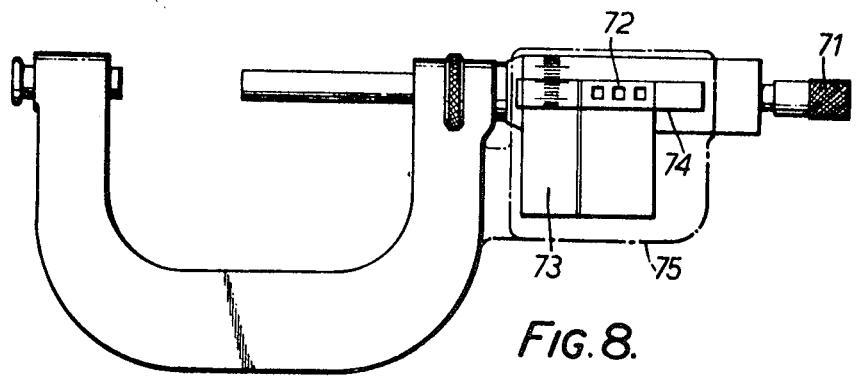
FIG. 8 shows the device fitted to a micrometre.

FIG. 8 shows how the number of revolutions of the drum 71 can be indicated in the window 72. The belt 73 and cursor 74 give an indication of the conversion of the metric reading into inches. The conversion device could be in a housing 75.

The principle of operation is the same as with the device already described.

What I claim as my invention and desire to secure by Letters Patent is:

1. A device for converting measurements in a first system of units to measurements in a second system of units comprising a cylinder having a principal axis, and carrying on a peripheral surface thereof graduations representing measurements in one system of units, mounting means on which said cylinder is mounted for rotation about said axis, belt driving means rotatable with said cylinder, a flexible belt carrying graduations representing corresponding measurements in the second system of units and driven by said driving means in a path encircling said cylinder, in the course of which path said belt passes over a part of said peripheral surface adjacent the graduations on said cylinder, and is constrained by said driving means to travel with said part of said peripheral surface as said cylinder turns, said device also comprising a set of numerals on one of the cylinder and belt and viewing means on the other of the cylinder and belt for indicating a selected one of the numerals representing the number of complete revolutions of the belt or cylinder.

2. A device as claimed in claim 1 in which the belt overlaps the cylinder and has a window through which numerals on the cylinder can be viewed.

3. A device as claimed in claim 1 in which the belt overlaps the cylinder and has numerals and the cylinder has specially coloured areas for showing up the numerals when the overlapping part of the belt runs over them.

4. A device as claimed in claim 1 including means for permitting selected relative movement between the cylinder and the belt to bring either set of numerals opposite the viewing means to zero.

5. A device as claimed in claim 2 in which the belt includes a transparent strip along its length and the cylinder carries a mark opposite the zero on the numbers to be viewed through the window in the belt, and capable of being viewed through the transparent strip.

6. A device as claimed in claim 4 in which the belt carries a mark opposite the zero numeral.

7. A device as claimed in claim 1 in which the belt or cylinder has a number of windows or viewing means displaced circumferentially and displaying the same set of numbers.

8. A device as claimed in claim 1 including a cursor for viewing the graduations and having a number of marks each representing a different small error in one direction or the other.

9. A device as claimed in claim 1 including a lead screw, a cam, and means for driving the cam from the lead screw, for moving one of the belt and cylinder relatively to the length of the scale to be measured.

10. A device as claimed in claim 1 in which the belt has a window co-operating with a part of the cylinder which is of various colours, the colours changing from one to another as the reading gets nearer to a desired reading.

11. A device as claimed in claim 1 in which one revolution of the belt or cylinder is not equal to $10^n$ units of the scale on one of the belt and cylinder, the least significant figures being shown by windows and numbers on overlapping parts of the belt and cylinder.

12. A device as claimed in claim 11 in which one of the cylinder and belt has lists of numerals for making up various decimal figures required to be shown at that position while windows in the other of the belt and cylinder choose some only of the figures from the list for display.

References Cited
UNITED STATES PATENTS

| | | | |
|---|---|---|---|
| Re. 26,527 | 2/1969 | Rabinow | 116—115.5 |
| 1,155,440 | 10/1915 | Rebelski | 33—166 |
| 1,444,565 | 2/1923 | Smith | 33—166 |
| 2,958,136 | 11/1960 | Anderson | 33—166 |
| 3,198,165 | 8/1965 | Leonard | 116—115.5 |
| 3,418,965 | 12/1968 | Rabinow | 116—115.5 |

LOUIS J. CAPOZI, Primary Examiner

U.S. Cl. X.R.

33—166